United States Patent
Jeong et al.

(10) Patent No.: US 9,301,236 B2
(45) Date of Patent: Mar. 29, 2016

(54) NETWORK ACCESS MANAGEMENT METHOD OF COMMON TERMINAL AND RAILWAY DEDICATED TERMINAL

(71) Applicant: Electronics and Telecommunications Research Institute, Daejeon (KR)

(72) Inventors: Min Woo Jeong, Daejeon (KR); Sook Jin Lee, Daejeon (KR); Yong Seouk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 147 days.

(21) Appl. No.: 14/283,791

(22) Filed: May 21, 2014

(65) Prior Publication Data
US 2015/0038147 A1    Feb. 5, 2015

(30) Foreign Application Priority Data

Aug. 2, 2013  (KR) ........................ 10-2013-0092253

(51) Int. Cl.
| | |
|---|---|
| H04W 36/32 | (2009.01) |
| H04W 36/30 | (2009.01) |
| H04W 36/18 | (2009.01) |
| H04W 36/08 | (2009.01) |
| B61L 15/00 | (2006.01) |
| B61L 27/00 | (2006.01) |
| H04W 88/06 | (2009.01) |
| H04W 36/14 | (2009.01) |
| H04W 48/18 | (2009.01) |

(52) U.S. Cl.
CPC ........... *H04W 36/30* (2013.01); *B61L 15/0027* (2013.01); *B61L 27/0005* (2013.01); *B61L 2205/02* (2013.01); *H04W 36/14* (2013.01); *H04W 48/18* (2013.01); *H04W 88/06* (2013.01)

(58) Field of Classification Search
CPC ..... H04W 36/32; H04W 36/30; H04W 36/18; H04W 36/0083; H04W 36/12; H04W 52/40; H04W 88/06; H04W 48/18
See application file for complete search history.

(56) References Cited

U.S. PATENT DOCUMENTS

| | | | | |
|---|---|---|---|---|
| 2005/0259619 A1* | 11/2005 | Boettle | ................. | H04W 36/32 370/331 |
| 2011/0294511 A1* | 12/2011 | Cao | ........................ | H04W 16/24 455/442 |
| 2012/0322449 A1* | 12/2012 | Shimizu | ................ | H04W 36/24 455/436 |
| 2013/0178213 A1* | 7/2013 | Li | ..................... | H04W 36/0088 455/436 |
| 2014/0199963 A1* | 7/2014 | Mohebbi | ............... | H04W 40/02 455/410 |

FOREIGN PATENT DOCUMENTS

| KR | 10-2005-0074814 A | 7/2005 |
|---|---|---|
| KR | 10-2011-0024855 A | 3/2011 |

* cited by examiner

*Primary Examiner* — Sharad Rampuria
*Assistant Examiner* — Obidon Bassinan
(74) *Attorney, Agent, or Firm* — Rabin & Berdo, P.C.

(57) ABSTRACT

Provided is a network access management method of a terminal, the method including determining whether a terminal located adjacent to a railway dedicated wireless communication network is a common terminal or a railway dedicated terminal, based on a unique identifier (ID) of the terminal, and handing over the terminal to a different communication network allowing an access based on a result of the determining.

19 Claims, 13 Drawing Sheets

NETWORK ACCESS MANAGEMENT METHOD OF COMMON TERMINAL AND RAILWAY DEDICATED TERMINAL

CROSS-REFERENCE TO RELATED APPLICATION

This application claims the priority benefit of Korean Patent Application No. 10-2013-0092253, filed on Aug. 2, 2013, in the Korean Intellectual Property Office, the disclosure of which is incorporated herein by reference.

BACKGROUND

1. Field of the Invention

The present invention relates to a communication network access management method of a common terminal and a railway dedicated terminal, and more particularly, to communication network access management method of a common terminal and a railway dedicated terminal preferentially sharing a frequency band, based on a region, assigned to a railway dedicated wireless communication network to be used for general communication network.

2. Description of the Related Art

Recently, with rapid developments in electronic engineering and communication engineering, research is being actively conducted to combine facets of each field. For example, a combination of a mechanical railway control and communication technology has brought about recent innovations. By applying a wireless communication technology to a railway communication technology through which a relatively small quantity of data is transmitted and received using a track circuit, a railway network may be easily managed and maintenance costs may also be reduced.

A global system for mobile communications-railway (GSM-R) technology configured by transforming a GSM to be exclusively used for a railway communication is currently being used throughout Europe and China. Although data transmission and reception is unavailable due to an occurrence of an error in a base station, a GSM-R communication network including two networks may be provided with an improved stability by subtly communicating using another network between the two networks. For example, in the GSM-R communication network, a GSM-R dedicated frequency may be assigned to a band in a range of 800 kilohertz (kHz) and 900 kHz so as to transmit and receive data used for a train control, and provide a voice communication service.

However, since the GSM-R technology corresponds to a second generation wireless communication technology, an advanced railway service such as a passenger service, a wireless video information service, and the like currently required in a railway industry may not be applicable. To solve this issue, a long term evolution (LTE), a worldwide interoperability for microwave access (WiMAX), and a wideband code division multiple access (W-CDMA), previously included in a wideband wireless communication technology, have been considered for use in the railway communication, and an LTE-railroad (LTE-R) obtained by transforming the LTE is being expanded as a next generation wireless communication technology for a train control.

SUMMARY

An aspect of the present invention provides a communication network access management method of allowing a terminal to flexibly use a railway dedicated wireless communication network and a mobile communication network, each using an identical frequency band by suggesting a method of configuring a network allowing a frequency band assigned to a railway dedicated wireless communication network to be used for general communications in a region in which the railway dedicated wireless network is not installed.

Another aspect of the present invention also provides a communication network access management method of distributing traffic of a mobile communication network by detouring an access of a terminal to the mobile communication network using a railway dedicated frequency when the traffic is concentrated on the mobile communication network in a region in which a railway dedicated wireless communication network is not installed.

Still another aspect of the present invention also provides an access management method of reducing a quantity of a load occurring in a mobile communication network and efficiently using a railway dedicated frequency band assigned to a railway dedicated wireless communication network by allowing the railway dedicated frequency band of the railway dedicated wireless communication network used for a restricted usage in a restricted region, to be used for general communications in a region not including a railway.

According to an aspect of the present invention, there is provided a network access management method of a terminal, the method including determining whether a terminal located adjacent to a railway dedicated wireless communication network is a common terminal or a railway dedicated terminal, based on a unique identifier (ID) of the terminal, and handing over the terminal to a different communication network allowing an access based on a result of the determining.

According to another aspect of the present invention, there is also provided a network access method of a common terminal, the method including accessing a first communication network using a frequency band for general communications available to the common terminal, handing over to a second communication network using a railway dedicated frequency band based on a traffic status of the first communication network, and changing an access state based on a second (S) pilot occurring in a base station of the second communication network.

According to still another aspect of the present invention, there is also provided a network access method of a railway dedicated terminal, the method including accessing a third communication network using a railway dedicated frequency band, and changing an access state based on a railway (R) pilot occurring in a base station of the third communication network.

According to yet another aspect of the present invention, there is also provided a network access management apparatus including a terminal determiner to determine whether a terminal located adjacent to a railway dedicated wireless communication network is a common terminal or a railway dedicated terminal, based on a unique ID of the terminal, and a handover unit to handover the terminal to a different communication network allowing an access based on a result of the determining.

According to further another aspect of the present invention, there is also provided a common terminal including a first communication network access unit to access a first communication network using a frequency band for general communications available to the common terminal, a second communication network access unit to access a second communication network using a railway dedicated frequency band based on a traffic status of the first communication network, and an access state change unit to change an access state based on an S pilot occurring in a base station of the second communication network.

According to still another aspect of the present invention, there is also provided a railway dedicated terminal including a third communication network access unit to access a third communication network using a railway dedicated frequency band, and an access state change unit to change an access state based on an R pilot occurring in a base station of the third communication network.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
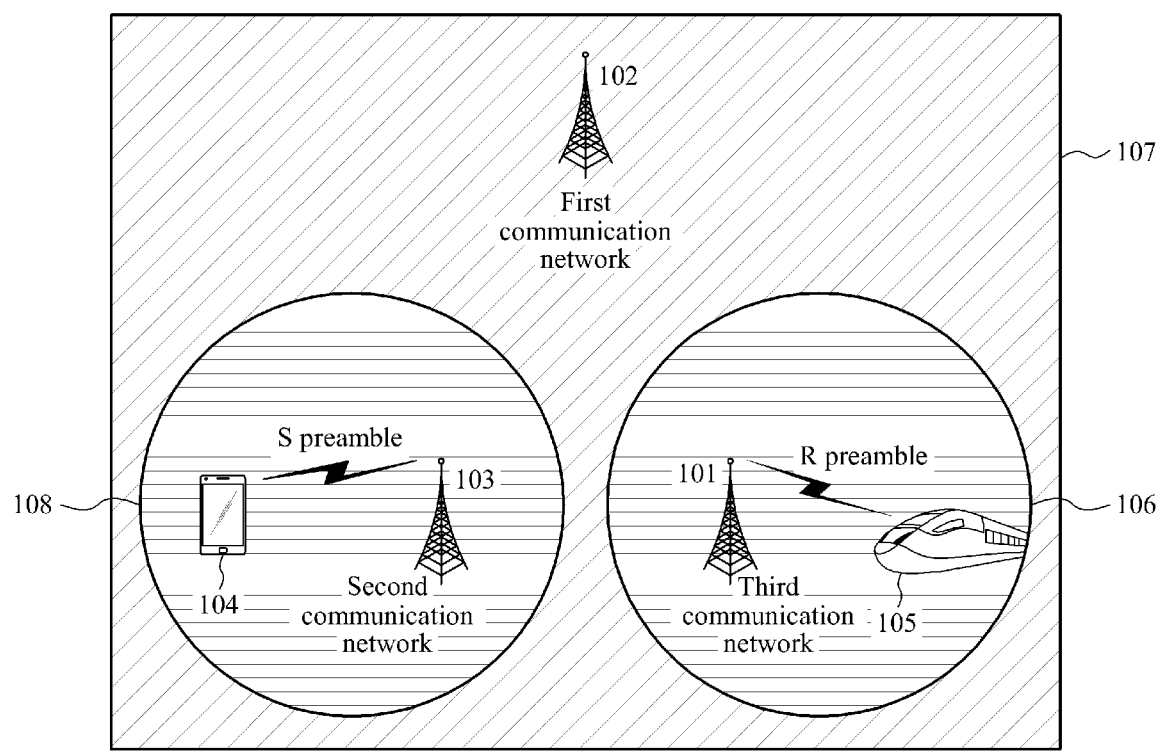
FIG. 1 is a diagram illustrating different communication networks, each allowing an access corresponding to a type of a terminal according to an example embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating different communication networks, each allowing an access corresponding to a type of a terminal according to an example embodiment.

Referring to FIG. 1, a communication network access management apparatus may determine a type of a terminal located adjacent to a railway dedicated wireless communication network, and hand over the terminal to a different communication network allowing an access based on the type of the terminal. The communication network may include a first communication network 102, a second communication network 103, and a third communication network 101.

The first communication network 102 may be a communication network using a frequency band for general communications available to a common terminal 104. The first communication network 102 may also be referred to as an F communication network depending on an embodiment. Here, the frequency band for general communications may correspond to a general mobile communication network, and may be a frequency band used in a communication network installed nationwide through a cell planning of a mobile carrier. Also, a region including the first communication network 102 may be a region 107 providing a communication network service for general communications.

The second communication network 103 may be a communication network using a railway dedicated frequency band available to the common terminal 104. The second communication network 102 may also be referred to as an S communication network depending on an embodiment. For example, the second communication network 103 may be a communication network allowing a terminal to use the railway dedicated frequency band as the frequency band for general communications in an area in which the railway dedicated communication network is not installed. Also, a region including the second communication network 103 may be a region 108 in which a general communication network using the railway dedicated frequency band is installed.

In this example, the second communication network 103 may be connected to the common terminal 104. Here, the common terminal 104 may be a terminal allowed to be used in the frequency band for general communications. Depending on a case, the common terminal 104 may be handed over to access the second communication network 103 after initially accessing the first communication network 102.

The third communication network 101 may be a communication network using the railway dedicated frequency band available to a railway dedicated terminal 105. The third communication network 101 may also be referred to as an R communication network depending on an embodiment. Also, the third communication network 101 may use the railway dedicated frequency band, and may be a communication network not allowing accesses of terminals, aside from a railway dedicated terminal 105. Also, a region including the third communication network 101 may be a region 106 in which the railway dedicated wireless communication network is installed, and the railway dedicated wireless communication network may be installed along a predetermined route over the general communication network.

When an identical frequency band is excessively used in the region 106 in which the railway dedicated wireless communication network is installed, a magnitude of interference may be increased and thus, the increase in the magnitude of interference may cause degradation in a level of communication reliability. To avoid this, the third communication network 101 may disallow use of the railway dedicated frequency band by the common terminal 104. Thus, the second communication network 103 and the third communication network 101 may follow a transition condition of a communication network. Descriptions about the transition condition of a communication network will be provided with reference to FIGS. 6 and 8.

In this example, the first communication network 102, the second communication network 103, and the third communication network 101 may include an identical mobile communication system for a smooth communication network transition of a terminal. Since the second communication network 103 and the third communication network 101 use an identical railway dedicated frequency band, ranges of installation of the second communication network 103 and the third communication network 101 may be arranged to avoid an overlap.

Figure 2:
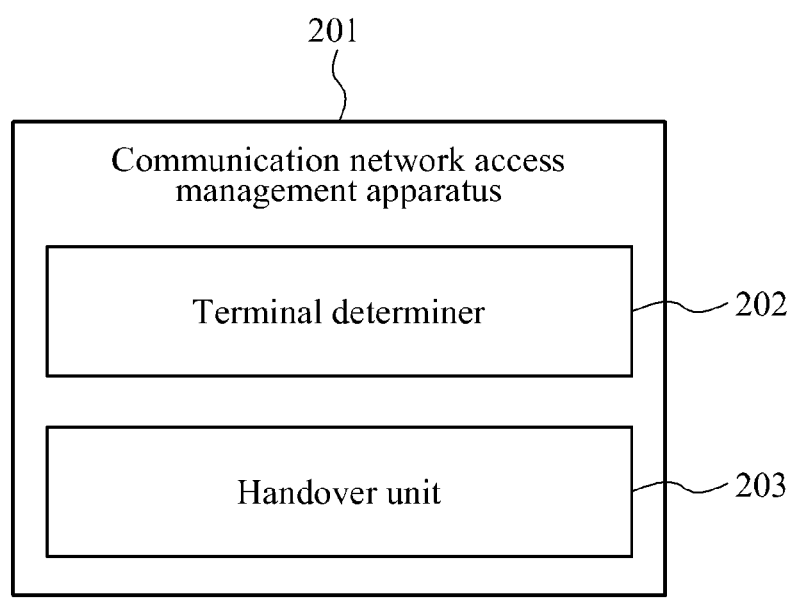
FIG. 2 is a diagram illustrating a communication network access management apparatus of a terminal according to an example embodiment.

FIG. 2 is a diagram illustrating a communication network access management apparatus 201 of a terminal according to an example embodiment.

Referring to FIG. 2, the communication network access management apparatus 201 may include a terminal determiner 202 and a handover unit 203. The communication network access management apparatus 201 may hand over a terminal being used in a general communication network, to be used in a railway dedicated frequency band based on a traffic status of the general communication network.

For example, the terminal determiner 202 may determine whether a terminal located adjacent to a railway dedicated communication network is a common terminal or a railway dedicated terminal based on a unique identifier (ID) of the terminal. Thus, the terminal determiner 202 may extract a plurality of terminals located in a region in which the railway dedicated wireless communication network is installed and a region in which the railway dedicated wireless communication network is not installed. Also, the terminal determiner 202 may verify a unique ID of the extracted terminal, and determine a type of the terminal. Here, the unique ID may be an ID, for example, a universal subscriber identity module (USIM) number included in a terminal, used to identify a terminal. The type of the terminal may include the railway dedicated terminal or the common terminal. The railway dedicated terminal may be a terminal communicating based on the railway dedicated frequency band of the railway dedicated wireless communication network. The common terminal may be a terminal communicating based on a frequency band of the general communication network. The common terminal may also be a terminal communicating based on the railway dedicated frequency band using the communication access management apparatus 201.

In addition, the terminal may include a different preamble to distinguish a usage of the terminal included in a communication network to which the terminal is handed over based on the determined type. Descriptions about the different preamble will be provided with reference to FIGS. 5 and 7.

The handover unit 203 may hand over the terminal located adjacent to the railway dedicated wireless communication network to a different communication network allowing an access based on a result of the determining. For example, when the terminal is determined to be the common terminal, the handover unit 203 may hand over the common terminal to a second communication network. In this instance, since the common terminal generally uses the frequency band of the general communication network, initial access to the second communication network using the railway dedicated frequency band by the common terminal may be disallowed. Thus, the common terminal may be handed over to the second communication network from a first communication network to which the common terminal makes an initial connection. For example, the common terminal may initially access the first communication network for a communication. In this instance, when it is determined that traffic distribution is required due to excessive usage of the first communication network, the common terminal may be handed over from the first communication network to the second communication network.

In addition, when the terminal is determined to be the railway dedicated terminal, the handover unit 203 may hand over the determined railway dedicated terminal to a third communication network. In this instance, the railway dedicated terminal may be allowed to access the third communication network using a code division multiple access (CDMA) code uniquely assigned to the railway dedicated terminal. Here, access to the third communication network by a terminal not using the CDMA code uniquely assigned to the railway dedicated terminal may be disallowed.

Also, the handover of the railway dedicated terminal may be performed within the railway frequency band based on the railway dedicated wireless communication network installed for each region. The railway dedicated terminal may be handed over between the third communication networks, for example, from a third communication network of a region A to a third communication network of a region B using the railway dedicated frequency band based on the railway dedicated wireless communication network installed along a predetermined route. Thus, the railway dedicated terminal may not be handed over to the first communication network and the second communication network.

Accordingly, the terminal may not be handed over to a different communication network, aside from a communication network allowing an access based on a use of the terminal.

The communication network access management apparatus 201 may preferentially share the railway dedicated frequency band for use in the general communication network for each region. Also, the communication network access management apparatus 201 may share the railway dedicated frequency band for use in the general communication network and reuse the railway dedicated frequency band limited for use in a railway, thereby realizing an efficient use of the railway dedicated frequency band.

Figure 3:
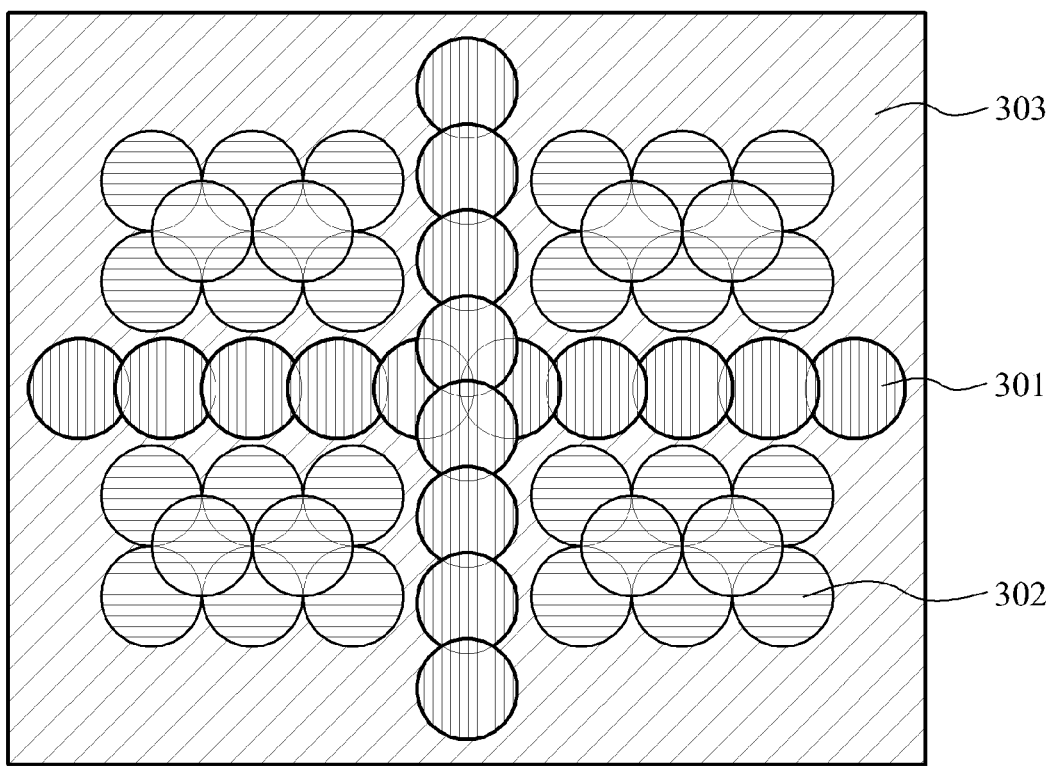
FIG. 3 is a diagram illustrating an arrangement of communication networks for using a railway dedicated frequency band as a frequency band for general communications according to an example embodiment.

FIG. 3 is a diagram illustrating an arrangement of communication networks for using a railway dedicated frequency band as a frequency band for general communications according to an example embodiment.

Referring to FIG. 3, a third communication network 310 may be installed along a predetermined route. In this instance, the third communication network 301 may be formed using the railway dedicated frequency band through an installation over a region in which a first communication network 303 is installed.

In addition, the second communication network 302 may be formed at a predetermined distance from the third communication network 301 in a region in which the third communication network 301 corresponding to a railway dedicated wireless communication network is not installed. In this instance, a second communication network 302 may include a general communication network using the railway dedicated frequency band.

Although the second communication network 302 and the third communication network 301 use an identical railway dedicated frequency band, each of the second communication network 302 and the third communication network 301 may have a different usage and thus, it may be necessary to distinguish the respective networks. Accordingly, the second communication network 302 and the third communication network 301 may be separately configured in a region providing a general communication network service without overlapping.

Figure 4:
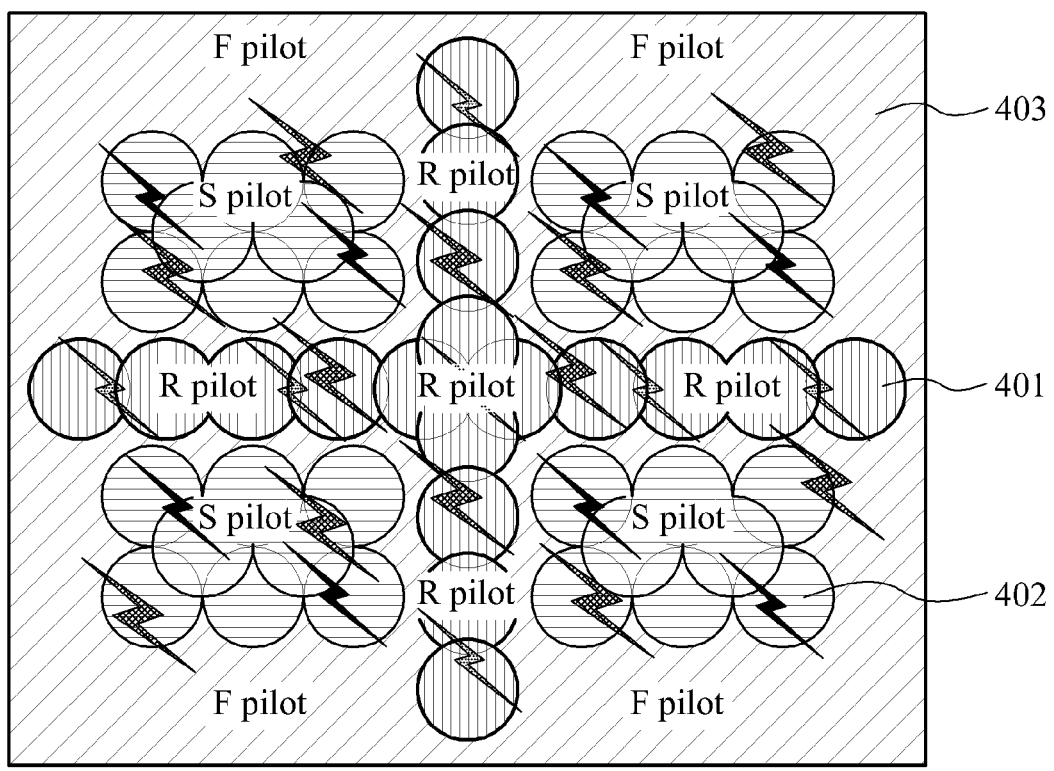
FIG. 4 is a diagram illustrating occurrences of pilots differing from each other based on a type of a communication network according to an example embodiment.

Referring to FIG. 4, a different pilot may periodically occur in a base station included in each of a first communication network 403, a second communication network 402, and a third communication network 401. Here, a usage of the base station of each of the communication networks may be distinguished based on the different pilots occurring in the base station of each of the communication networks.

For example, in the base station of the first communication network 403, a first (F) pilot may occur as a subset of periodically occurring pilots. The F pilot may use the frequency band of the general communication network and thus, the F pilot may be determined to be a signal occurring in the base station of the first communication network 403 providing the general communication network service.

In the base station of the second communication network 402, a second (S) pilot may occur as a subset of periodically occurring pilots. The S pilot may use the railway dedicated frequency band and thus, the S pilot may be determined to be a signal occurring in the base station of the second communication network 402 providing the general communication network service.

In the base station of the third communication network 401, a railway (R) pilot may occur as a subset of periodically occurring pilots. The R pilot may use the railway dedicated frequency band and thus, the R pilot may be determined to be a signal occurring in the base station of the third communication network 401 providing the railway dedicated communication network service.

The terminal may receive the pilot occurring in the base station of each of the communication networks, and determine whether the communication networks allow an access of the terminal, thereby performing a handover or changing an access state.

Figure 5:
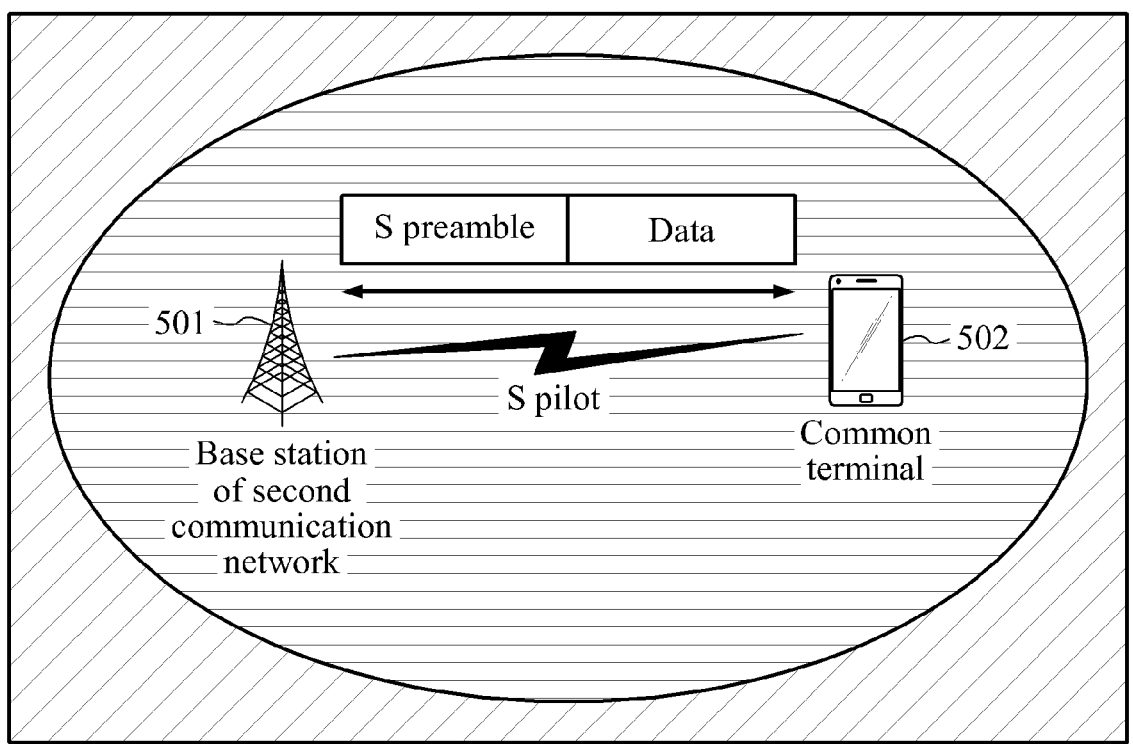
FIG. 5 is a diagram illustrating a state in which a common terminal is normally connected to a communication network using a railway dedicated frequency band as a frequency band for general communications according to an example embodiment.

FIG. 5 is a diagram illustrating a state in which a common terminal 502 is normally connected to a communication network using a railway dedicated frequency band as a frequency band for general communications according to an example embodiment.

Referring to FIG. 5, in a base station 501 of a second communication network, an S pilot may periodically occur to distinguish a usage of a base station of a communication network. The common terminal 502 may receive the S pilot occurring in the base station of the second communication network and determine whether the communication network allows an access of a terminal. The common terminal 502 may be handed over to the second communication network based on a result of the determining. In this instance, the common terminal 502 may be in a state of being initially connected to the first communication network using a frequency band for general communications.

In addition, the common terminal 502 may combine, with data, a preamble for distinguishing a usage of a terminal included in a communication network. For example, the common terminal 502 may combine, to data, a second (S) preamble indicating a subset of a preamble in order to indicate a terminal using a general communication network service based on the railway dedicated frequency band.

When the common terminal 502 is handed over to the second communication network through the aforementioned process, the common terminal 502 may be in a state in which data transmission and reception is available, and an access to a communication network is normally performed.

Figure 6:
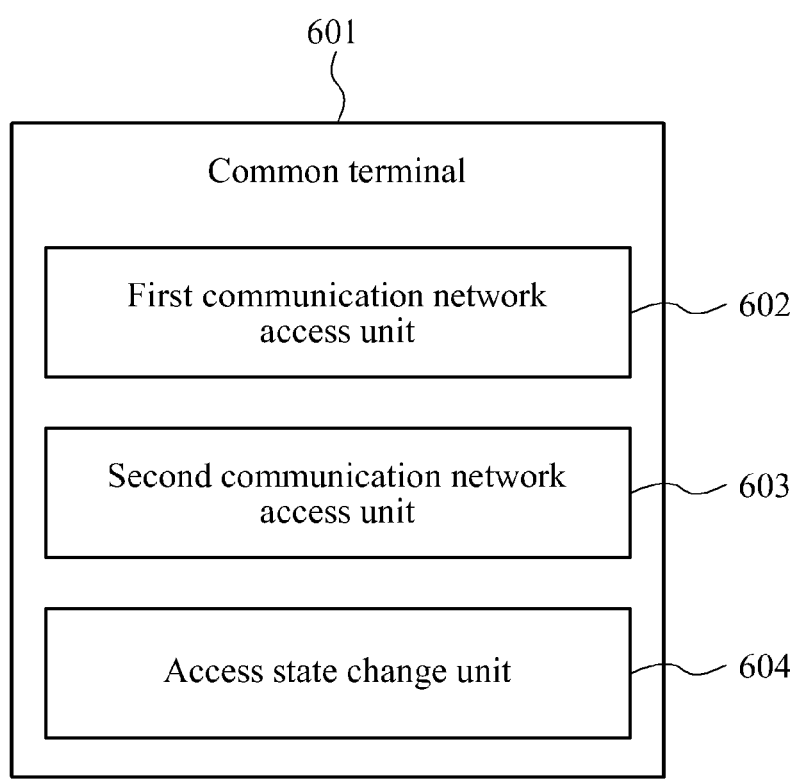
FIG. 6 is a diagram illustrating a common terminal according to an example embodiment.

FIG. 6 is a diagram illustrating a common terminal 601 according to an example embodiment.

Referring to FIG. 6, the common terminal 601 may include a first communication network access unit 602, a second communication network access unit 603, and an access state change unit 604. The common terminal 601 may be a terminal using a shared railway dedicated frequency band as a general communication network.

The first communication network access unit 602 may initially access a first communication network using a frequency band for general communications available to the common terminal 601. In general, the common terminal 601 may communicate using the first communication network, and may need to be initially connected to the first communication network to be handed over to a second communication network.

The second communication network access unit 603 may be handed over to the second communication network using a railway dedicated frequency band based on a traffic status of the first communication network. For example, when use of the first communication network is excessive and a traffic distribution is required, the second communication network access unit 603 may be handed over to the second communication network. In this instance, the second communication network access 603 may receive an S pilot occurring in a base station of the second communication network based on a location of the common terminal 601. The second communication network access unit 603 may be handed over to the second communication network of the received S pilot. The common terminal 601 handed over to the second communication network may perform data transmission and reception on data including an S preamble.

Figure 10:
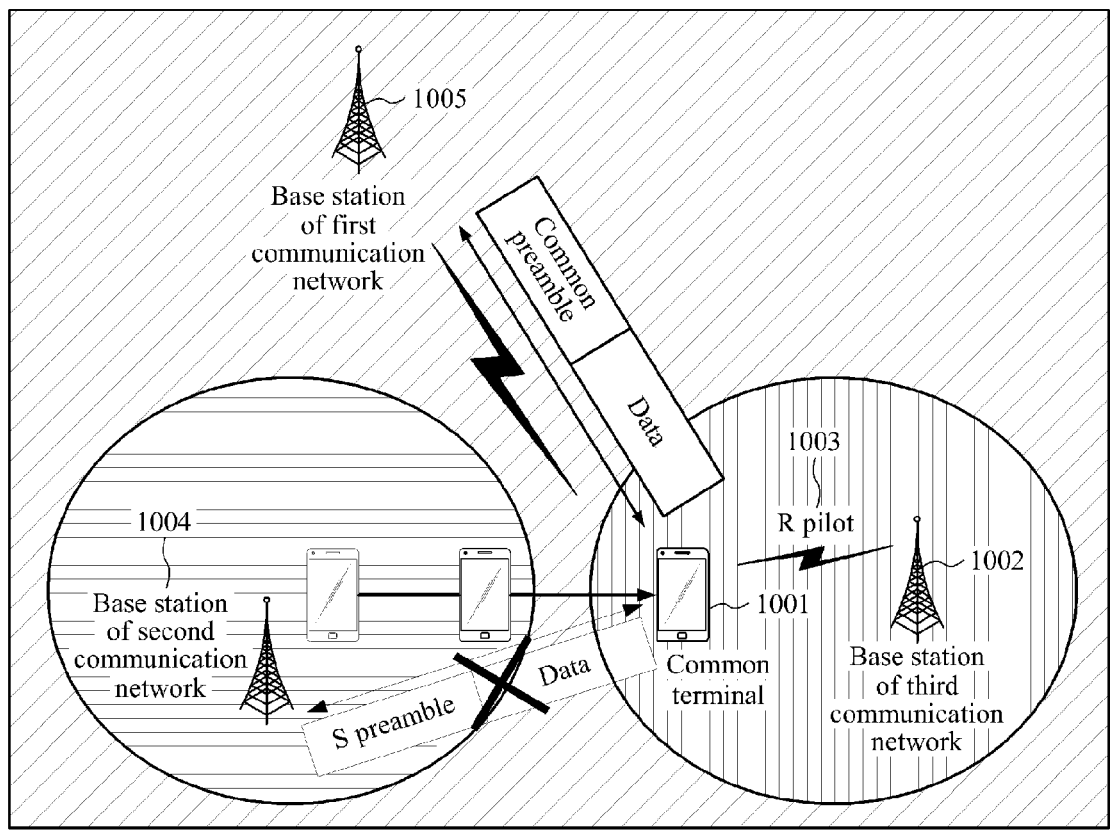
FIG. 10 is a diagram illustrating an abnormal access state of a common terminal according to an example embodiment.

Descriptions about the access state change unit 604 will be provided with reference to FIG. 10. The access state change unit 604 may change an access state based on an S pilot occurring in a base station 1004 of a second communication network, and the changing may be performed based on a transition condition of a communication network. For example, when a pilot occurring in a different communication network is received in lieu of the S pilot, the access state change unit 604 may perform a handover from a currently connected communication network to the first communication network, or terminate an access to a communication network. As an example, when a railway (R) pilot 1003 occurring in a base station 1002 of a third communication network is received based on a railway dedicated wireless communication network, the access state change unit 604 may determine that a common terminal 1001 being connected to the second communication network enters a region in which the railway dedicated wireless communication network is installed. Also, the access state change unit 604 may change an access state of a terminal by handing over the common terminal 1001 to the first communication network or terminate an access based on a result of the determining. In this instance, the common terminal 1001 may be connected to a base station 1005 of the first communication network, and maintain a communication with a communication network using a common preamble.

Since the common terminal 602 may communicate using the first communication network and the second communication network, when a pilot of the third communication network corresponding to the railway dedicated wireless communication network is received, the common terminal 601 may determine that the terminal is in an abnormal access state and thus, change the access state of the terminal.

Figure 7:
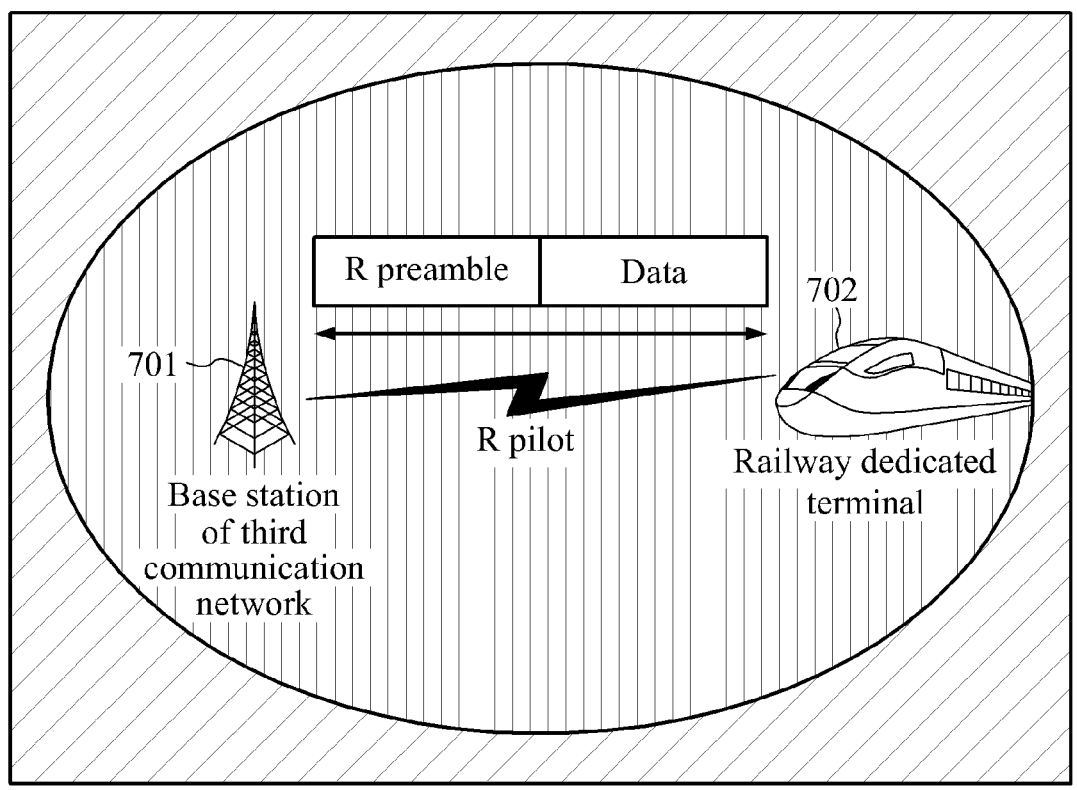
FIG. 7 is a diagram illustrating a state of a railway dedicated terminal normally connected to a communication network using a railway dedicated frequency band according to an example embodiment.

FIG. 7 is a diagram illustrating a state of a railway dedicated terminal normally connected to a communication network using a railway dedicated frequency band according to an example embodiment.

Referring to FIG. 7, an R pilot for distinguishing a usage of a base station of a communication network may periodically occur in a base station 701 of a third communication network.

A railway dedicated terminal 702 may receive the R pilot occurring in the base station 701 of the third communication network and determine whether a communication network allows an access of a terminal. In this instance, when the communication network allows the access of the terminal, the railway dedicated terminal 702 may access to the third communication network using a CDMA code assigned to the railway dedicated terminal 702.

In addition, the railway dedicated terminal 702 may combine, with data, a preamble for distinguishing a usage of a terminal included in a communication network. For example, the railway dedicated terminal 702 may combine, to data, an R preamble indicating a subset of a preamble to indicate that the railway dedicated terminal 702 is a terminal using a railway dedicated frequency band.

When the railway dedicated terminal 702 access to the third communication network through the aforementioned process, the railway dedicated terminal 702 may be in a state in which data transmission and reception is available and an access to the communication network is normally performed.

Figure 8:
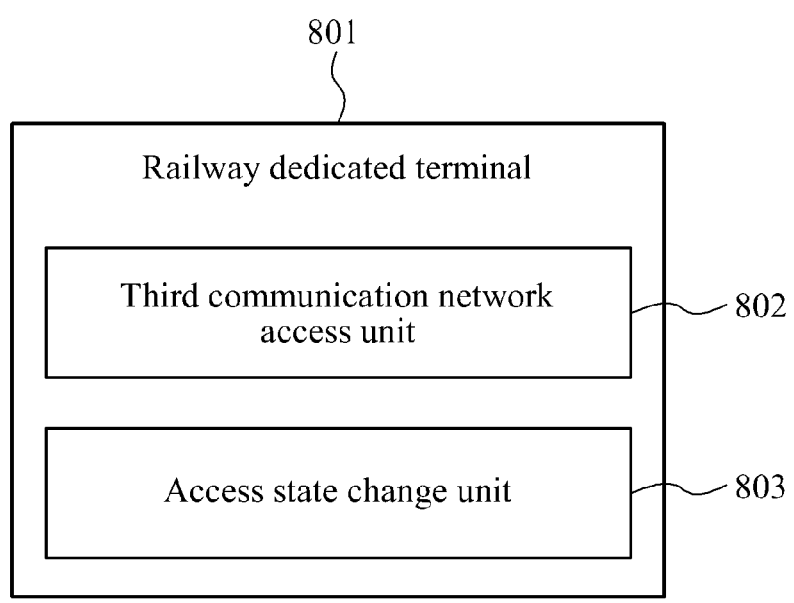
FIG. 8 is a diagram illustrating a railway dedicated terminal according to an example embodiment.

FIG. 8 is a diagram illustrating a railway dedicated terminal 801 according to an example embodiment.

Referring to FIG. 8, the railway dedicated terminal 801 may include a third communication network access unit 802 and an access state change unit 803.

The third communication network access unit 802 may access a third communication network using a railway dedicated frequency band. The third communication network access unit 802 may be handed over only to another third communication network base station using the railway dedicated frequency band.

The access state change unit 803 may change an access state based on an R pilot occurring in the base station of the third communication network, and the changing may be performed based on a transition condition of a communication network. For example, when a pilot occurring in a base station of a different communication network is received in lieu of the R pilot, the access state change unit 803 may change the access state by terminating an access. As an example, when an S pilot occurring in a base station of a second communication network is received, the access state change unit 803 may determine that the railway dedicated terminal 701 being connected to the third communication network is no longer in a range of a railway dedicated mobile communication network due to a derailment. Also, the access state change unit 803 may change the access state of the terminal by terminating a communication with the third communication network based on a result of the determining. In this instance, an occurrence probability of a derailment may be relatively low.

Since the railway dedicated terminal 701 may communicate using the third communication network corresponding to the railway dedicated wireless communication network, when a pilot of a first communication network or the second communication network is received, the railway dedicated terminal 701 may be determined to be in an abnormal access state and thus, the access state of the terminal may be changed.

Figure 9:
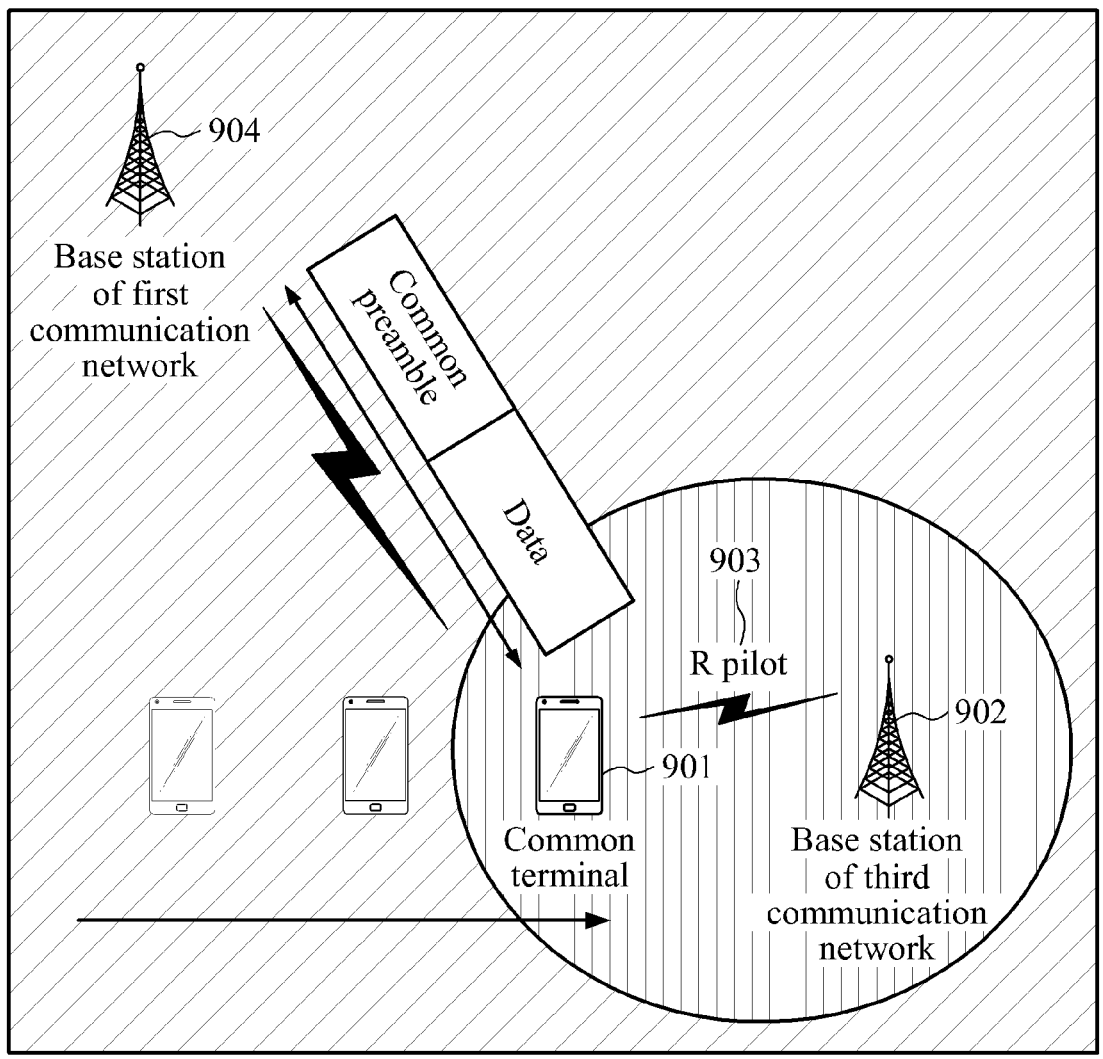
FIG. 9 is a diagram illustrating an access state of a common terminal using a frequency band for general communications according to an example embodiment.

FIG. 9 is a diagram illustrating an access state of a common terminal 901 using a frequency band for general communications according to an example embodiment.

Referring to FIG. 9, the common terminal 901 may receive a pilot of a base station 904 of a first communication network, and be connected to the first communication network to perform data transmission and reception. Also, the common terminal 901 may receive an R pilot 903 occurring in a base station 902 of a third communication network. In this instance, the common terminal 901 may not be handed over to another communication network, and maintain a current connection with the first communication network. Interference occurring between frequencies may be prevented because a frequency band of the first communication network may differ from a frequency band of the third communication network.

Figure 11:
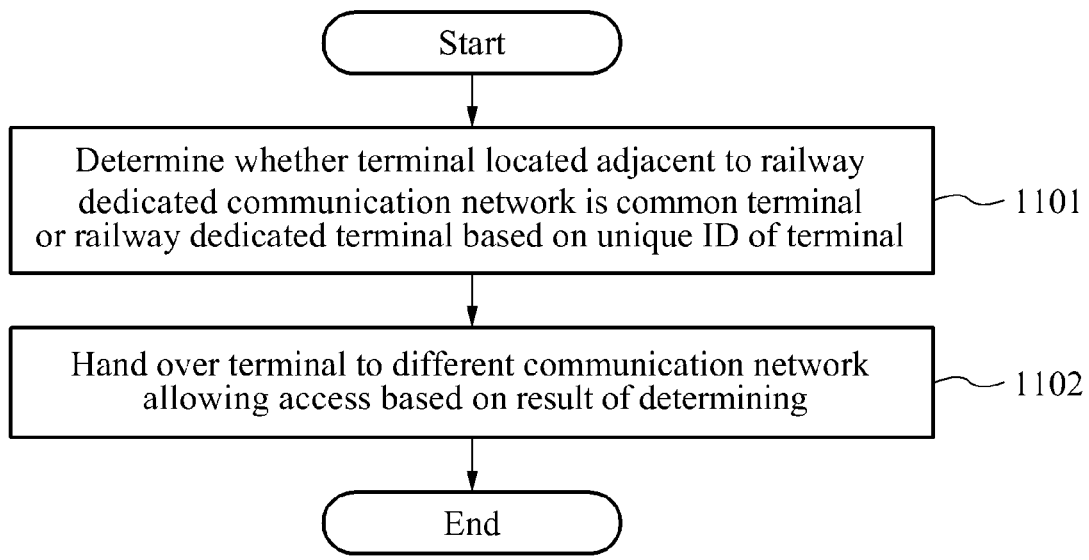
FIG. 11 is a diagram illustrating a communication network access management method of a terminal according to an example embodiment.

FIG. 11 is a diagram illustrating a communication network access management method of a terminal according to an example embodiment.

In operation 1101, a communication network access management apparatus may determine whether a terminal located adjacent to a railway dedicated communication network is a common terminal or a railway dedicated terminal based on a unique ID of the terminal. In this instance, the communication network access management apparatus may determine whether the terminal is the common terminal or the railway dedicated terminal based on the unique ID, for example, a USIM number used to identify a terminal. The railway dedicated terminal may also include a CDMA code assigned to the railway dedicated terminal.

In operation 1102, the communication network access management apparatus may hand over the terminal located adjacent to the railway dedicated wireless communication network to a different communication network allowing an access based on a result of the determining. Here, the communication network may include a first communication network, a second communication network, and a third communication network. The first communication network may use a frequency band for general communications available to the common terminal, and be included in a region providing a communication network service for general communications. The second communication network may use a railway dedicated frequency band available to the common terminal, and be included in a region in which a general communication network is installed. The third communication network may use the railway dedicated frequency band available to the railway dedicated terminal, and be installed along a predetermined route over the general communication network in a region in which a railway dedicated wireless communication network is installed.

When the terminal is determined to be the common terminal, the communication network access management apparatus may hand over the common terminal to a second communication network. In this instance, the common terminal may be handed over to the second communication network from a first communication network to which the common terminal is initially being connected. In addition, when the terminal is determined to be the railway dedicated terminal, the communication network access management apparatus may attach the determined railway dedicated terminal to the third communication network.

Here, each of the common terminal and the railway dedicated terminal may not be handed over to a different communication network, aside from a communication network allowing an access based on a type of the terminal. Thus, the common terminal may be handed over to the first communication network or the second communication network, and the railway dedicated terminal may be handed over to a third communication network base station of the region in which the railway dedicated wireless communication network is installed.

Figure 12:
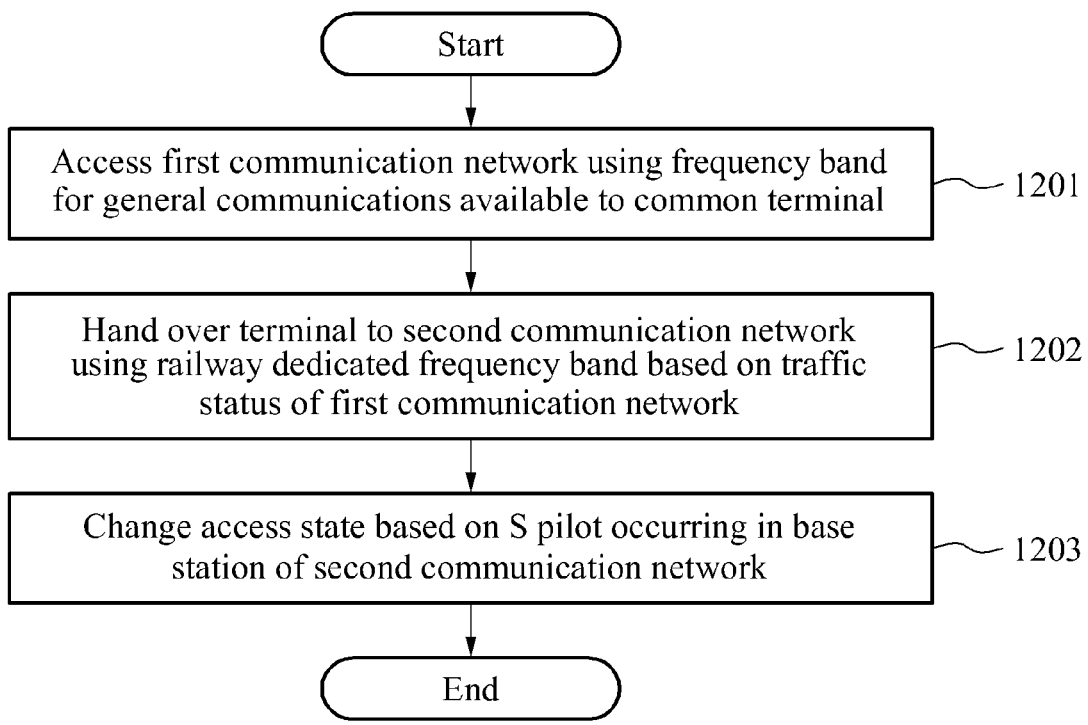
FIG. 12 is a diagram illustrating a communication network access method of a common terminal according to an example embodiment.

FIG. 12 is a diagram illustrating a communication network access method of a common terminal according to an example embodiment.

In operation 1201, the common terminal may initially access a first communication network using a frequency band for general communications available to the common terminal.

In operation 1202, the common terminal may be handed over to a second communication network using a railway dedicated frequency band based on a traffic status of the first communication network. When it is determined that traffic distribution is required due to an excessive use of the first communication network, the common terminal may be handed over from the first communication network to the second communication network.

In operation 1203, the common terminal may change an access state based on an S pilot occurring in a base station of the second communication network. For example, when a pilot occurring in a base station of a different communication network is received in lieu of the S pilot, the common terminal may be handed over from a currently connected communication network to the first communication network, or terminate an access to the communication network. Also, when the common terminal is handed over to the first communication network, the common terminal may be connected to a base station of the first communication network, and maintain a communication with the communication network using a common preamble.

Figure 13:
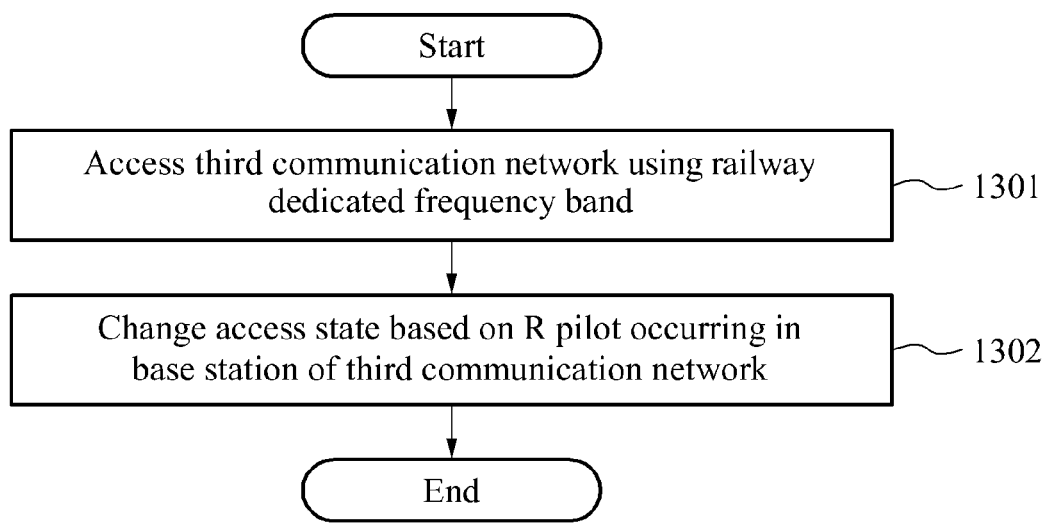
FIG. 13 is a diagram illustrating a communication network access method of a railway dedicated terminal according to an example embodiment.

FIG. 13 is a diagram illustrating a communication network access method of a railway dedicated terminal according to an example embodiment.

In operation 1301, the railway dedicated terminal may access a third communication network using a railway dedicated frequency band.

In operation 1302, the railway dedicated terminal may change an access state based on an R pilot occurring in a base station of the third communication network. For example, when a pilot occurring in a base station of a different communication network is received in lieu of the R pilot, the railway dedicated terminal may change the access state by terminating an access. When the railway dedicated terminal receives the pilot occurring in the base station of the different communication network, it may be determined that, for example, a vehicle derails from a track.

According to an aspect of the present invention, it is possible to provide a communication network access management method of allowing a terminal to flexibly use a railway dedicated wireless communication network and a mobile communication network, each using an identical frequency band by suggesting a method of configuring a network allowing a frequency band assigned to a railway dedicated wireless communication network to be used for general communications in a region in which the railway dedicated wireless network is not installed.

According to another aspect of the present invention, it is possible to provide a communication network access management method of distributing traffic of mobile communication network by detouring an access of a terminal to the mobile communication network using a railway dedicated frequency when the traffic is concentrated on the mobile communication network in a region in which a railway dedicated wireless communication network is not installed.

According to still another aspect of the present invention, it is possible to provide an access management method of reducing a quantity of a load occurring in a mobile communication network and efficiently using a railway dedicated frequency band assigned to a railway dedicated wireless communication network by allowing the railway dedicated frequency band of the railway dedicated wireless communication network used for a restricted usage in a restricted region, to be used for general communications in a region not including a railway.

The method according to the above-described embodiments may be recorded in non-transitory computer-readable media including program instructions to implement various operations embodied by a computer. The media may also include, alone or in combination with the program instructions, data files, data structures, and the like.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A network access management method of a terminal, the method comprising:
   determining whether a terminal located adjacent to a railway dedicated wireless 5 communication network is a common terminal or a railway dedicated terminal, based on a unique identifier (ID) of the terminal; and
   handing over the terminal to a different communication network allowing an access based on a result of the determining;
   wherein the communication network comprises a first communication network using a frequency band for general communications available to the common terminal, a second communication network using a railway dedicated frequency band available to the common terminal, and a third communication network using a railway dedicated frequency band available to the railway dedicated terminal.

2. The method of claim 1, wherein the common terminal or the railway dedicated terminal comprises a different preamble to distinguish a usage of the terminal included in a communication network to which the terminal is handed over based on a type of the terminal corresponding to the result of the determining.

3. The method of claim 2, wherein when the terminal is determined to be the common terminal, the common terminal comprises a second (S) preamble as a subset of a preamble, and when the terminal is determined to be the railway dedicated terminal, the railway dedicated terminal comprises a railway (R) preamble as the subset of the preamble.

4. The method of claim 1, wherein when the terminal is determined to be the common terminal, the handing over comprises handing over the common terminal to the second communication network.

5. The method of claim 1, wherein the common terminal initially accesses the 5 first communication network before the common terminal is handed over to the second communication network based on a traffic status of the first communication network.

6. The method of claim 1, wherein when the terminal is determined to be the railway dedicated terminal, the handing over comprises handing over the railway dedicated terminal to the third communication network.

7. The method of claim 1, wherein each of the common terminal and the railway dedicated terminal are not handed over to a different communication network, aside from the communication network allowing an access based on a terminal type.

8. The method of claim 1, wherein, in a base station comprised in the third communication network, an R pilot occurs as a subset of a pilot corresponding to the third communication network, and in a base station comprised in the second communication network, an S pilot occurs as a subset of a pilot corresponding to the second communication network.

9. The method of claim 8, wherein when the R pilot is received from the base station of the third communication network, the common terminal is determined to enter a region in which the railway dedicated wireless communication network is installed, and the common terminal is handed over to the first communication network or an access is terminated.

10. The method of claim 8, wherein when the S pilot is received from the base station of the second communication network, the railway dedicated terminal is determined to no longer be in range of the railway dedicated wireless communication network due to a derailment or being in an abnormal state, and an access is terminated.

11. A network access method of a common terminal, the method comprising: accessing a first communication network using a frequency band for general communications available to the common terminal;
    handing over to a second communication network using a railway dedicated frequency band based on a traffic status of the first communication network; and
    changing an access state based on a second (S) pilot occurring in a base station of the second communication network;
    wherein the communication network comprises a first communication network using a frequency band for general communications available to the common terminal, a second communication network using a railway dedicated frequency band available to the common terminal, and a third communication network using a railway dedicated frequency band available to the railway dedicated terminal.

12. The method of claim 11, wherein the common terminal comprises an S preamble as a subset of a preamble used for data transmission and reception to distinguish a usage of a terminal included in the second communication network.

13. The method of claim 11, wherein when a pilot occurring in a base station of different communication network is received in lieu of the S pilot, the changing comprises changing the access state of the common terminal by handing over the common terminal to the first communication network or terminating an access.

14. A network access method of a railway dedicated terminal, the method comprising: accessing a third communication network using a railway dedicated frequency band; and
    changing an access state based on a railway (R) pilot occurring in a base station of the third communication network;
    wherein the communication network comprises a first communication network using a frequency band for general communications available to the common terminal, a second communication network using a railway dedicated frequency band available to the common terminal, and a third communication network using a railway dedicated frequency band available to the railway dedicated terminal.

15. The method of claim 14, wherein the railway dedicated terminal comprises an R preamble as a subset of a preamble used for data transmission and reception to distinguish a usage of a terminal included in the third communication network.

16. The method of claim 14, when a pilot occurring in a base station of a different communication network is received in lieu of the R pilot, the changing comprises changing the access state by terminating an access.

17. A network access management apparatus comprising:
    a terminal determiner to determine whether a terminal located adjacent to a railway 15 dedicated wireless communication network is a common terminal or a railway dedicated terminal, based on a unique identifier (ID) of the terminal; and
    a handover unit to handover the terminal to a different communication network allowing an access based on a result of the determining;
    wherein the communication network comprises a first communication network using a frequency band for general communications available to the common terminal, a second communication network using a railway dedicated frequency band available to the common terminal, and a third communication network using a railway dedicated frequency band available to the railway dedicated terminal.

18. A common terminal comprising:
    a first communication network access unit to access a first communication network using a frequency band for general communications available to the common terminal;
    a second communication network access unit to access a second communication network using a railway dedicated frequency band based on a traffic status of the first 25 communication network; and
    an access state change unit to change an access state based on a second (S) pilot occurring in a base station of the second communication network;
    wherein the communication network comprises a first communication network using a frequency band for general communications available to the common terminal, a second communication network using a railway dedicated frequency band available to the common terminal, and a third communication network using a railway dedicated frequency band available to the railway dedicated terminal.

19. A railway dedicated terminal comprising:
    a third communication network access unit to access a third communication network using a railway dedicated frequency band; and
    an access state change unit to change an access state based on a railway (R) pilot occurring in a base station of the third communication network.

* * * * *